United States Patent
Yoon

(10) Patent No.: US 12,374,707 B2
(45) Date of Patent: Jul. 29, 2025

(54) POWER NET SYSTEM FOR FUEL CELLS AND METHOD FOR CONTROLLING THE SAME

(71) Applicants: HYUNDAI MOTOR COMPANY, Seoul (KR); KIA CORPORATION, Seoul (KR)

(72) Inventor: Hee Sung Yoon, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 281 days.

(21) Appl. No.: 18/079,397

(22) Filed: Dec. 12, 2022

(65) Prior Publication Data

US 2023/0282855 A1    Sep. 7, 2023

(30) Foreign Application Priority Data

Mar. 4, 2022   (KR) .................. 10-2022-0028026

(51) Int. Cl.

| | |
|---|---|
| *H01M 8/04858* | (2016.01) |
| *H01M 8/043* | (2016.01) |
| *H01M 8/04537* | (2016.01) |
| *H01M 8/04664* | (2016.01) |
| *H01M 8/249* | (2016.01) |

(52) U.S. Cl.
CPC ......... *H01M 8/0491* (2013.01); *H01M 8/043* (2016.02); *H01M 8/04589* (2013.01); *H01M 8/04597* (2013.01); *H01M 8/04604* (2013.01); *H01M 8/04686* (2013.01);
(Continued)

(58) Field of Classification Search
CPC ........... H01M 16/006; H01M 2250/20; H01M 8/043; H01M 8/04559; H01M 8/04589; H01M 8/04597; H01M 8/04604; H01M 8/04686; H01M 8/0488; H01M 8/04888;
(Continued)

(56) References Cited

U.S. PATENT DOCUMENTS 6,670,063 B1 * 12/2003 Aoyagi ............... H01M 10/486
323/305
2005/0164048 A1 * 7/2005 Wheat ............... H01M 8/04559
429/444
(Continued)

FOREIGN PATENT DOCUMENTS

KR          100802798 B1    2/2008

*Primary Examiner* — Victoria H Lynch
(74) *Attorney, Agent, or Firm* — Lempia Summerfield Katz LLC

(57) ABSTRACT

Disclosed are a fuel cell power net system and a method for controlling the same. The fuel cell power net system includes: a fuel cell controller configured to control current output from a fuel cell unit; at least one DC/DC converter configured to boost DC voltage and to output the boosted DC voltage; a battery connected to the fuel cell unit in parallel so as to supply DC power to the fuel cell unit; a load controller configured to provide demand output information; and a fuel cell power controller configured to receive the demand output information, to calculate output levels required by the fuel cell unit and the battery, to compare a current output level of the fuel cell unit with the output level required by the fuel cell unit, and to provide a control value to the fuel cell controller depending on a result of the comparison.

13 Claims, 8 Drawing Sheets

(52) U.S. Cl.
CPC ....... *H01M 8/04888* (2013.01); *H01M 8/249* (2013.01); *H01M 2250/20* (2013.01)

(58) Field of Classification Search
CPC ............. H01M 8/0491; H01M 8/0494; H01M 8/04947; H01M 8/249; Y02E 60/50
See application file for complete search history.

(56) References Cited

U.S. PATENT DOCUMENTS

| | | | |
|---|---|---|---|
| 2006/0127710 A1* | 6/2006 | Schulte ................. | H01M 8/249 429/444 |
| 2010/0173211 A1* | 7/2010 | Kim .................. | H01M 8/04582 429/432 |
| 2020/0295392 A1* | 9/2020 | Bono ................ | H01M 8/04932 |

* cited by examiner

POWER NET SYSTEM FOR FUEL CELLS AND METHOD FOR CONTROLLING THE SAME

This application claims the benefit of Korean Patent Application No. 10-2022-0028026, filed on Mar. 4, 2022, which is hereby incorporated by reference as if fully set forth herein.

BACKGROUND OF THE DISCLOSURE

Field of the Disclosure

The present disclosure relates to a power net system for fuel cells and a method for controlling the same, and more particularly, to a power net system for fuel cells and a method for controlling the same which may control the output of a fuel cell system while providing high voltage power using a minimum number of converters.

Discussion of the Related Art

Fuel cells are eco-friendly alternative energy sources that generate electrical energy from substances abundant on earth, such as hydrogen, and are in the spotlight along with solar cells.

However, fuel cells have high impedance, and thus have a low response speed to change in load. Further, fuel cells have a low power density compared to batteries and are unsuitable for a demand for high output. Thus, fuel cells and a battery may be combined into a hybrid system.

For these reasons, a fuel cell system has been developed in which a secondary battery, which is rechargeable, is provided so that power is supplied selectively from fuel cells and the secondary battery. However, the conventional fuel cell system has low power efficiency due to use of converters. Further, the conventional fuel cell system includes a large number of complicated elements, and thus requires considerably high production costs.

Korean Patent Unexamined Publication No. 10-2007-0108796 discloses a fuel cell system in which a converter is omitted and fuel cells and a battery are connected in series. In the fuel cell system having the above-described structure, the battery is directly connected to the fuel cells and thus it is difficult to variably control the output of the fuel cell. Further, the output voltage band of the fuel cells and the voltage band of the battery should be similar to each other so that the battery can be charged, and a charger should function as a converter when the voltage bands of the fuel cells and the voltage bands of the battery are not similar.

Further, when fuel cells are connected in parallel so as to increase output, the same voltage is applied to the respective fuel cells and the respective fuel cells cannot be individually controlled. Thus, it is difficult to perform integrated output control.

SUMMARY OF THE DISCLOSURE

Accordingly, the present disclosure is directed to a power net system for fuel cells and a method for controlling the same that substantially obviates one or more problems due to limitations and disadvantages of the related art.

An object of the present disclosure is to provide a power net system for fuel cells and a method for controlling the same that may control the output of the fuel cell system while providing high voltage power using the minimum number of converters.

Another object of the present disclosure is to provide a power net system for fuel cells and a method for controlling the same that may prevent rapid durability deterioration using a high current density section in an arbitrary fuel cell due to performance deviation among fuel cells.

Yet another object of the present disclosure is to provide a power net system for fuel cells and a method for controlling the same that may control individual power balancing depending on characteristics of fuel cell stacks.

Additional advantages, objects, and features of the disclosure are set forth in part in the description that follows and in part should become apparent to those having ordinary skill in the art upon examination of the following, or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a fuel cell power net system includes: a fuel cell controller configured to control current output from a fuel cell unit; at least one DC/DC converter configured to boost DC voltage input thereto and to output the boosted DC voltage; a battery connected to the fuel cell unit in parallel so as to supply DC power to the fuel cell unit; a load controller configured to provide demand output information required by a load of an application; and a fuel cell power controller configured to receive the demand output information from the load controller, to calculate output levels required by the fuel cell unit and the battery, respectively, to compare a current output level of the fuel cell unit with the output level required by the fuel cell unit, and to provide a control value to the fuel cell controller depending on a result of the comparison.

When the current output level of the fuel cell unit is less than the output level required by the fuel cell unit, the fuel cell power controller may set a voltage dropped from a voltage at a front end of the at least one DC/DC converter to a target voltage so that the fuel cell unit uses a high current.

The fuel cell power net system may further include an inverter configured to convert DC power provided by the at least one DC/DC converter or the battery into AC power, and to supply the AC power to the load of the application.

The at least one DC/DC converter may include a plurality of DC/DC converters selectively connected to the fuel cell unit in series so as to be disposed between the fuel cell unit and the inverter.

The fuel cell power net system may further include a first switch disposed between the fuel cell unit and the plurality of DC/DC converters so as to selectively transmit an output voltage of the fuel cell unit to the plurality of DC/DC converters.

One DC/DC converter of the at least one DC/DC converter may be connected to the fuel cell unit in series, and a bypass circuit, provided in parallel to the one DC/DC converter and selectively connected to the fuel cell unit, may be disposed between the fuel cell unit and the inverter.

When the one DC/DC converter breaks down, the bypass circuit may be operated to transmit an output power of the fuel cell unit to the inverter.

The at least one DC/DC converter may be connected to the battery in series so as to be disposed between the battery and the inverter in parallel to the fuel cell unit.

The fuel cell unit may include a plurality of fuel cell stacks connected in parallel, and a switching unit configured to select at least one of the plurality of fuel cell stacks.

The switching unit may include reverse current blocking units configured to prevent inflow of reverse current into the plurality of fuel cell stacks, and a plurality of second switches configured to select fuel cell stacks to be used from among the plurality of fuel cell stacks.

The plurality of second switches may be relay switches configured to cut and open connection between contact points using electromagnetic induction.

The fuel cell power controller may check currents of respective fuel cell stacks, and may control power balancing depending on the respective fuel cell stacks.

The fuel cell power controller may control the power balancing in a section in which the application cruises or lands.

The fuel cell power controller may compare a difference between a maximum value and a minimum value out of sensing current values of the respective fuel cell stacks, based on a target voltage dropped from a voltage at a front end of the at least one DC/DC converter, with a threshold, and may selectively control operation of the fuel cell stacks depending on a result of the comparison.

The fuel cell power controller may compare current values of the respective fuel cells with an End Of Life (EOL) reference value, and may output a control signal depending on a result of the comparison.

In another aspect of the present disclosure, a method for controlling a fuel cell power net system having a fuel cell power controller configured to control a fuel cell unit having a plurality of fuel cell stacks connected in parallel so as to correspond to a demand output of a load of an application, may include: receiving, by the fuel cell power controller, the demand output of the load of the application; calculating, by the fuel cell power controller, outputs required by the fuel cell unit and a battery based on the demand output; receiving, by the fuel cell power controller, a current output of the fuel cell unit; comparing, by the fuel cell power controller, the current output of the fuel cell unit with the output required by the fuel cell unit; and controlling, by the fuel cell power controller, the output of the fuel cell unit depending on a result of the comparison.

The method may further include checking, by the fuel cell power controller, respective output currents of a plurality of fuel cell stacks connected in parallel and configured to form the fuel cell unit, and controlling, by the fuel cell power controller, power balancing depending on respective fuel cell stacks of the plurality of fuel cell stacks.

The method may further include comparing, by the fuel cell power controller, a difference between a maximum value and a minimum value out of sensing current values of the respective fuel cell stacks with a threshold, and selectively controlling, by the fuel cell power controller, operation of the respective fuel cell stacks depending on a result of the comparison.

It is to be understood that both the foregoing general description and the following detailed description of the present disclosure are explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Figure 1:
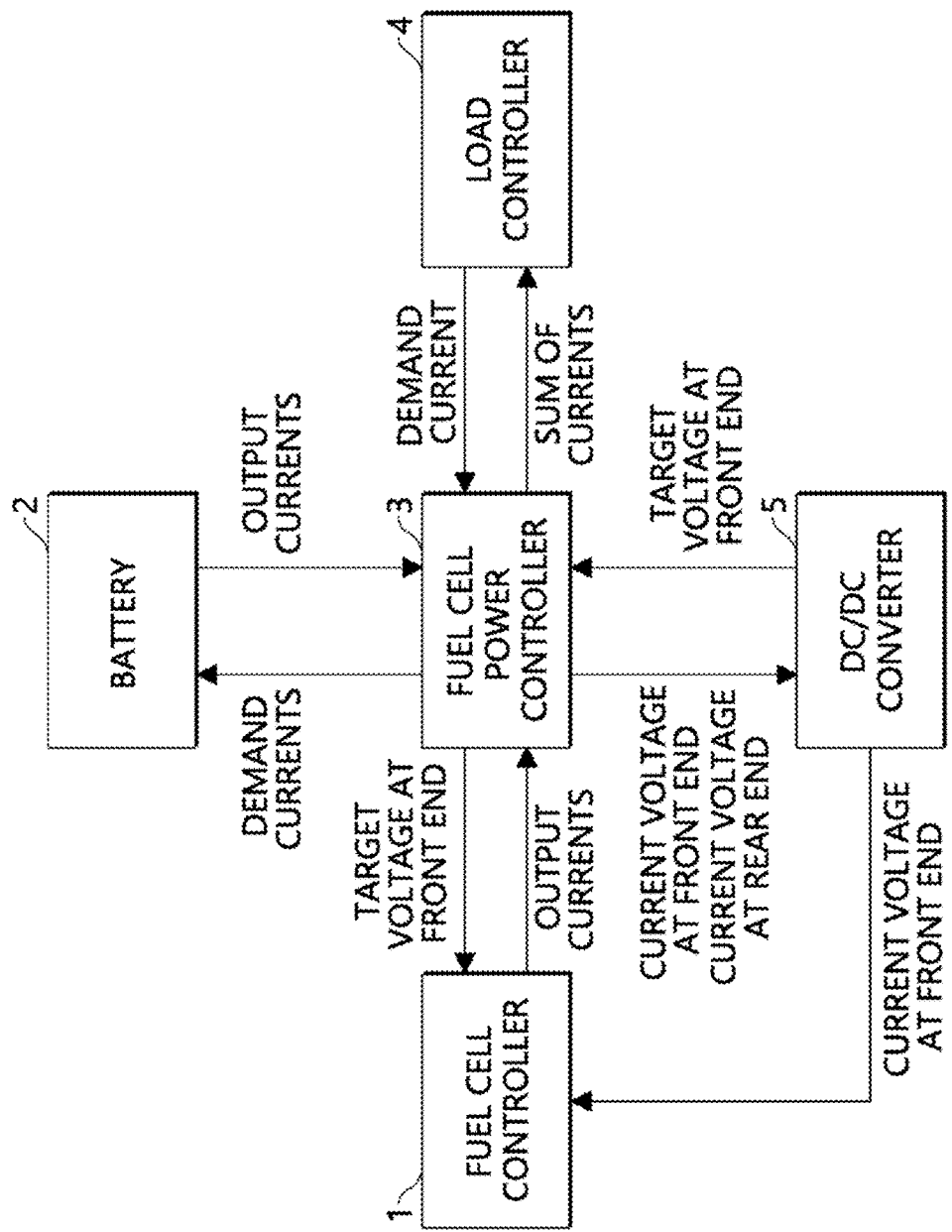
FIG. 1 is a block diagram illustrating signal transmission and reception relationships between respective elements of a fuel cell power net system according to an embodiment of the present disclosure.

Specific structural or functional descriptions in embodiments of the present disclosure set forth in the description that follows are exemplarily given to describe the embodiments of the present disclosure, and the embodiments of the present disclosure are not limited to the aspects disclosed herein but may be implemented in various different forms.

The present disclosure may be variously modified and implemented in various forms, and thus, specific embodiments, examples of which are illustrated in the accompanying drawings, are described in detail in the following description. However, the present disclosure should not be interpreted as being limited to the embodiments set forth herein, and it is understood that the present disclosure covers modifications, equivalents or alternatives which come within the scope and technical range of the disclosure.

In the following description of the embodiments, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," and the like.

The terminology used herein is for the purpose of describing particular embodiments only and is not intended to be limiting. As used herein, singular forms may be intended to include plural forms as well, unless the context clearly indicates otherwise. The terms "comprising" and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Unless defined otherwise, all terms including technical or scientific terms used in the following description have the same meanings as those of terms generally understood by those having ordinary skill in the art. Terms defined in generally used dictionaries should be interpreted as having meanings coinciding with contextual meanings in the related technology, and are not to be interpreted as having ideal or excessively formal meanings unless defined clearly in the description.

When an embodiment is implementable in a different way, functions or operations specified in specific blocks may be performed in a different order from the order specified in a flowchart. For example, two sequential blocks may be performed substantially simultaneously, or these blocks may be performed reversely depending on related functions or operations.

Hereinafter, a fuel cell power net system and a method for controlling the same according to the present disclosure is described with reference to the accompanying drawings.

FIG. 1 is a block diagram illustrating signal transmission and reception relationships between respective elements of the fuel cell power net system according to an embodiment of the present disclosure. As shown in this figure, the fuel cell power net system according to an embodiment of the present disclosure includes a fuel cell controller 1, a battery 2, a fuel cell power controller 3, a load controller 4, and at least one DC/DC converter 5.

The fuel cell controller 1 performs a function of controlling current output from a fuel cell unit.

The battery 2 is connected to the fuel cell unit in parallel, and supplies DC power to the fuel cell unit.

The load controller 4 provides demand output information required by the load of an application to the fuel cell power controller 3.

The at least one DC/DC converter 5 boosts DC voltage input thereto and then outputs the boosted DC voltage.

The fuel cell power controller 3 receives the demand output information from the load controller 4, calculates output levels required by the fuel cell unit and the battery 2, compares the current output level of the fuel cell unit with the output level required by the fuel cell unit, and provides a control value depending on a result of comparison to the fuel cell controller 1.

Figure 2:
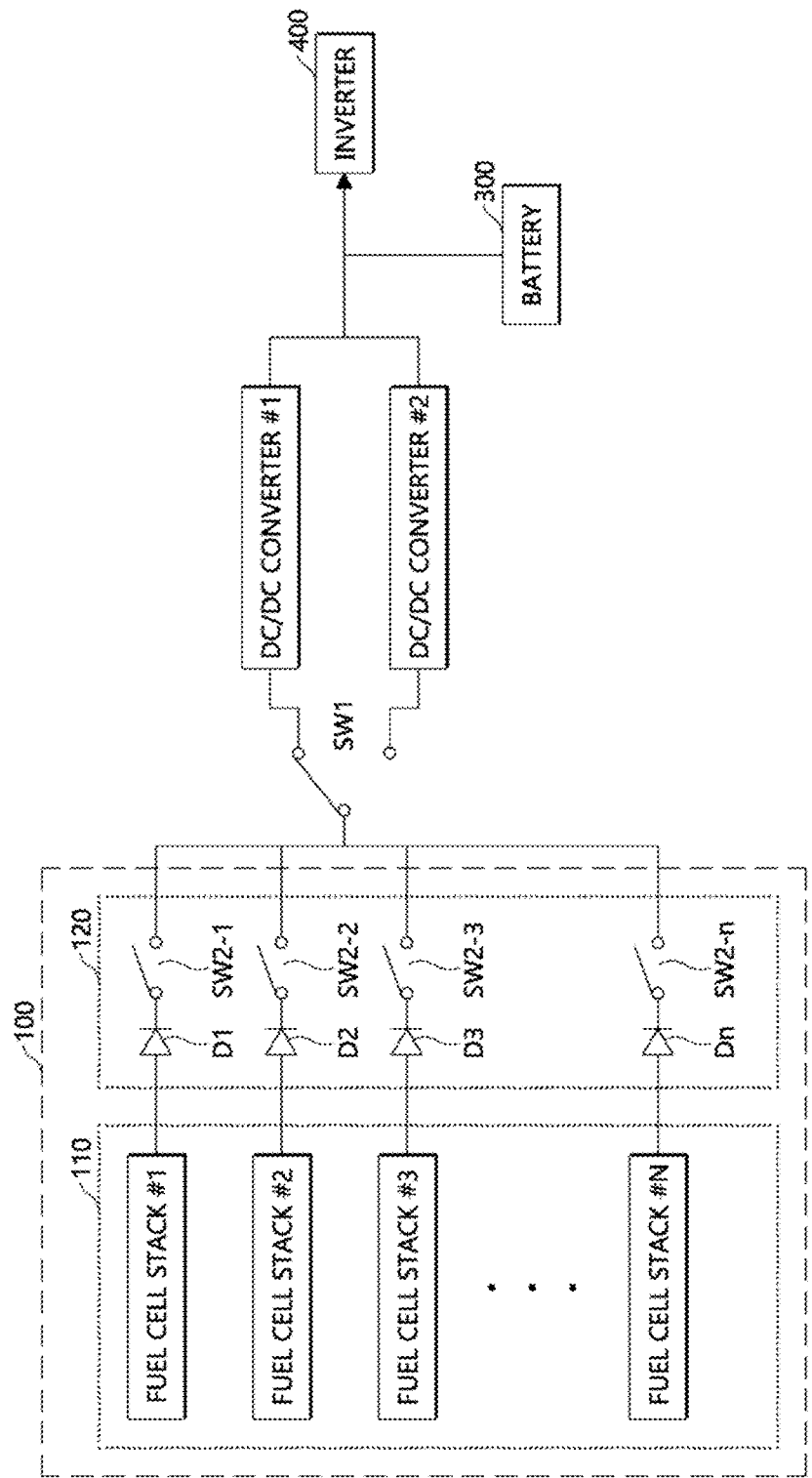
FIG. 2 is a block diagram illustrating the configuration of a fuel cell power net system according to an embodiment of the present disclosure.

FIG. 2 is a block diagram illustrating the configuration of a fuel cell power net system according to one embodiment of the present disclosure. As shown in this figure, the fuel cell power net system according to one embodiment of the present disclosure includes a fuel cell unit 100, a plurality of DC/DC converters 210 and 220, a battery 300, and an inverter 400.

The fuel cell unit 100 includes a plurality of fuel cell stacks 110 connected in parallel, and a switching unit 120 configured to select at least one of the plurality of fuel cell stacks 110.

The switching unit 120 includes a plurality of diodes D1, D2, . . . , and Dn serving as reverse current blocking units configured to prevent inflow of reverse current into the plurality of fuel cell stacks 110, and a plurality of second switches SW2-1, SW2-2, . . . , and SW2-$n$ configured to select at least one fuel cell stack 110 to be used from the plurality of fuel cell stacks 110. The plurality of second switches SW2-1, SW2-2, . . . , and SW2-$n$ may be relay switches that cut and open connection between contact points using electromagnetic induction.

The plurality of DC/DC converters 210 and 220 may be selectively connected to the fuel cell unit 100 in series. In other words, one of the DC/DC converters 210 and 220 is selected by the switching operation of a first switch SW1 disposed between the fuel cell unit 100 and the plurality of DC/DC converters 210 and 220, and receives the output voltage of the fuel cell unit 100.

The battery 300 is disposed in parallel to the DC/DC converters 210 and 220.

The inverter 400 converts the DC power provided by the DC/DC converter 210 or 220 and/or the battery 300 into AC power, and supplies the AC power to the load of the application.

Figure 3:
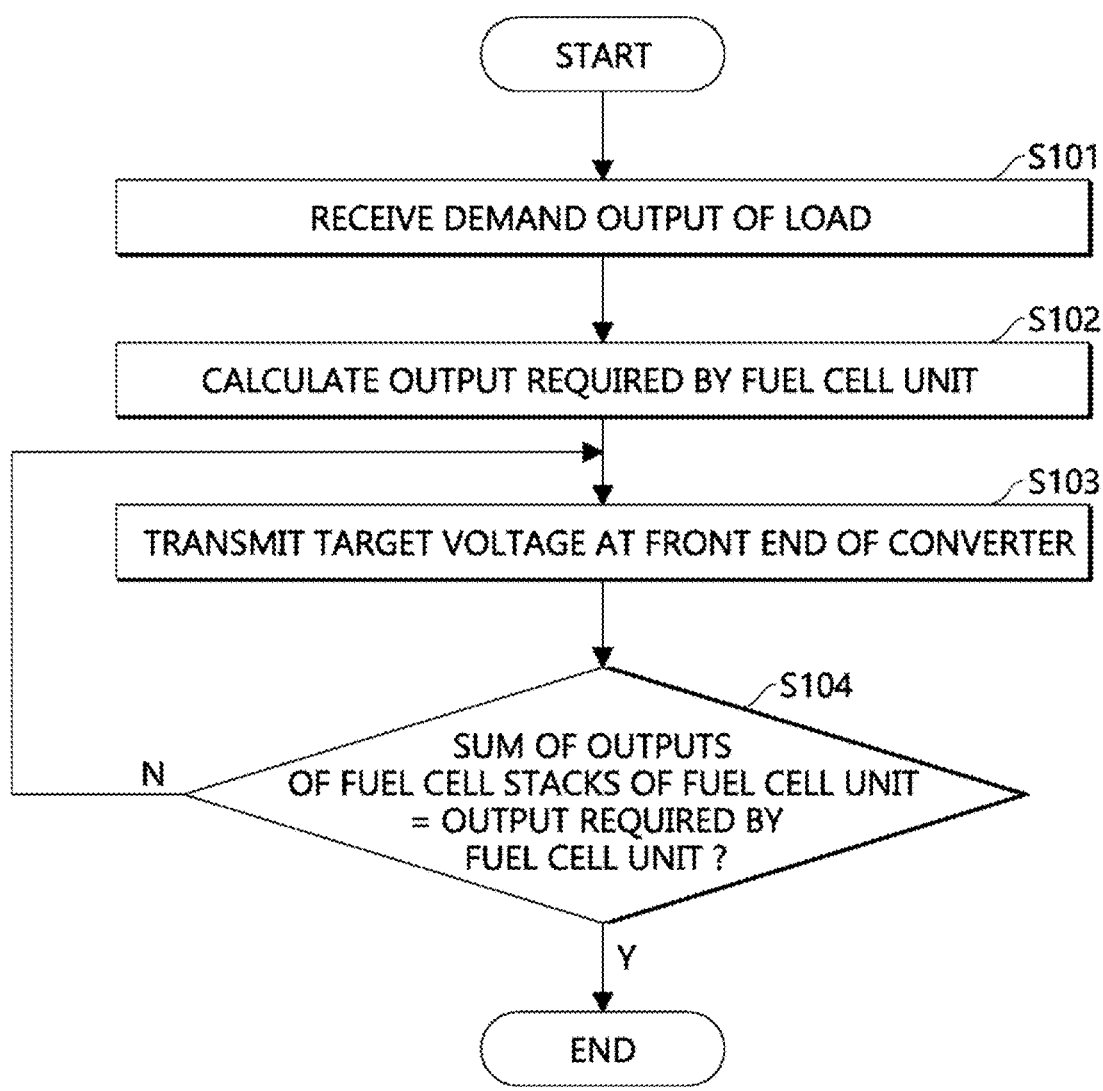
FIG. 3 is a flowchart representing a process of controlling the output of the fuel cell power net system according to an embodiment of the present disclosure.

FIG. 3 is a flowchart representing a process of controlling the output of the fuel cell power net system according to an embodiment of the present disclosure. Hereinafter, the process of controlling the output of the fuel cell power net system is described using the fuel cell power controller 3 as the subject of operation with reference to FIG. 1.

The fuel cell power controller 3 receives the demand output of the load of the application from the load controller 4 (S101).

Figure 4:
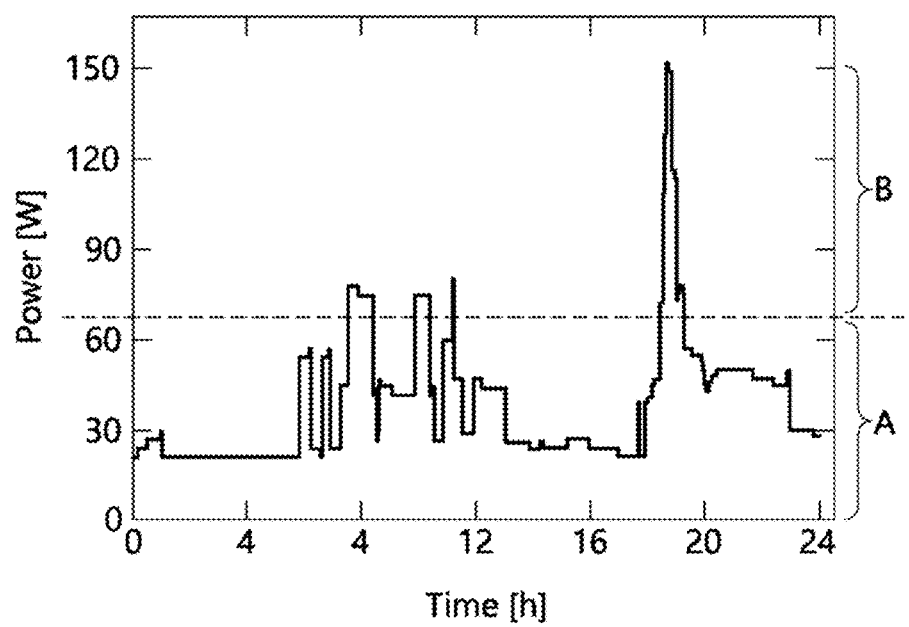
FIG. 4 is a graph showing output responses of fuel cells and a battery to demand output.

The fuel cell power controller 3 calculates outputs required by the fuel cell unit 100 and the battery 300 based on the demand output of the load of the application (S102). The battery 300 may require charging, and may assist with the output through discharging, depending on the situation. FIG. 4 is a graph showing output responses of fuel cells and the battery to the demand output. As shown in this figure, region "A" is a region in which the fuel cells alone are operated. When the available output of the fuel cells is greater than the demand output in such a section, the battery 300 may be charged with residual output. Region "B" is a region in which the demand output is greater than the available output of the fuel cells, and a shortage, which is not satisfied with the output of the fuel cells, is supplemented by the output of the battery 300 (due to discharging of the battery 300).

For example, when an aircraft cruises, power of about 20-22 kW produced by the fuel cells may be used in cruising of the aircraft and, when the aircraft takes off or raises, power of about 20 kW produced by the battery 300 may be additionally used.

The fuel cell power controller 3 receives the sum of currents of the outputs of the respective fuel cell stacks 110 of the fuel cell unit 100 at present, and compares the sum of the currents with the calculated output required by the fuel cell unit 100. A current sensor is applied to the output terminal of each of the plurality of fuel cell stacks 110 of the fuel cell unit 100, and the fuel cell controller 1 measures currents of the respective fuel cell stacks 110 through the current sensors and transmits the measured currents to the fuel cell power controller 3. When the sums of the currents of the outputs of the fuel cell stacks 110 of the fuel cell unit 100 currently is different from the output required by the fuel cell unit 100 (for example, when Current output<Required Output), a target voltage at the front end of the DC/DC converter 5 is dropped. In other words, the fuel cell power controller 3 sets a voltage dropped from the voltage at the front end of the DC/DC converter 5 to the target voltage so that the fuel cell unit 100 uses a high current, when the current output level of the fuel cell unit 100 is less than the output level required by the fuel cell unit 100. The fuel cell controller 1 configured to control the respective fuel cell stacks 110 controls the output of the fuel cells using the target voltage at the front end of the DC/DC converter 5, supplied from the fuel cell power controller 3 and the DC/DC converter 5. The fuel cell controller 1 configured to control the respective fuel cell stacks 110 transmits sensing current values to the fuel cell power controller 3 (S103).

The fuel cell power controller 3 determines whether or not the sum of the outputs of the fuel cell stacks 110 of the fuel cell unit 100 currently, received from the fuel cell controller 1, reaches the output required by the fuel cell unit 100, and controls the outputs the fuel cell stacks 110 of the fuel cell unit 100 until the sum of the outputs of the fuel cell stacks 110 reaches the output required by the fuel cell unit 100 (S104).

Figure 5:
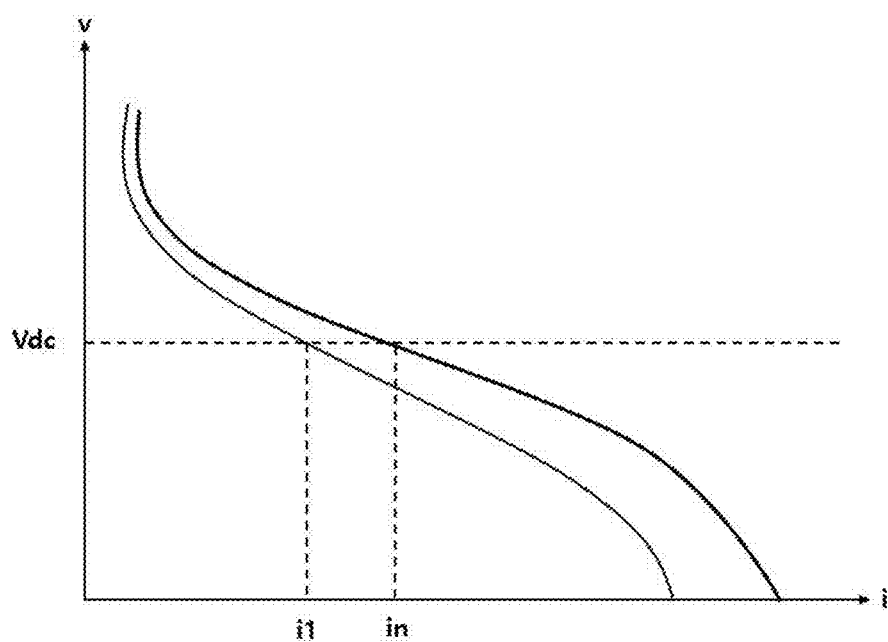
FIG. 5 is a graph showing current deviation when a plurality of fuel cell stacks is provided.

FIG. 5 is a graph showing current deviation when the plurality of fuel cell stacks 110 is provided. As shown in this figure, it may be found that there is a difference between the sensing output current value "i1" of the first fuel cell stack #1 and the sensing output current value "in" of the $n^{th}$ fuel cell stack #n at the same voltage Vdc. Therefore, the fuel cell controller 1 provides the currently output current values of the respective fuel cell stacks to the fuel cell power controller 3, and receives control values of the respective fuel cell stacks, calculated with respect to the target voltage at the front end of the DC/DC converter based on the currently output current values of the respective fuel cell stacks.

Figure 6:
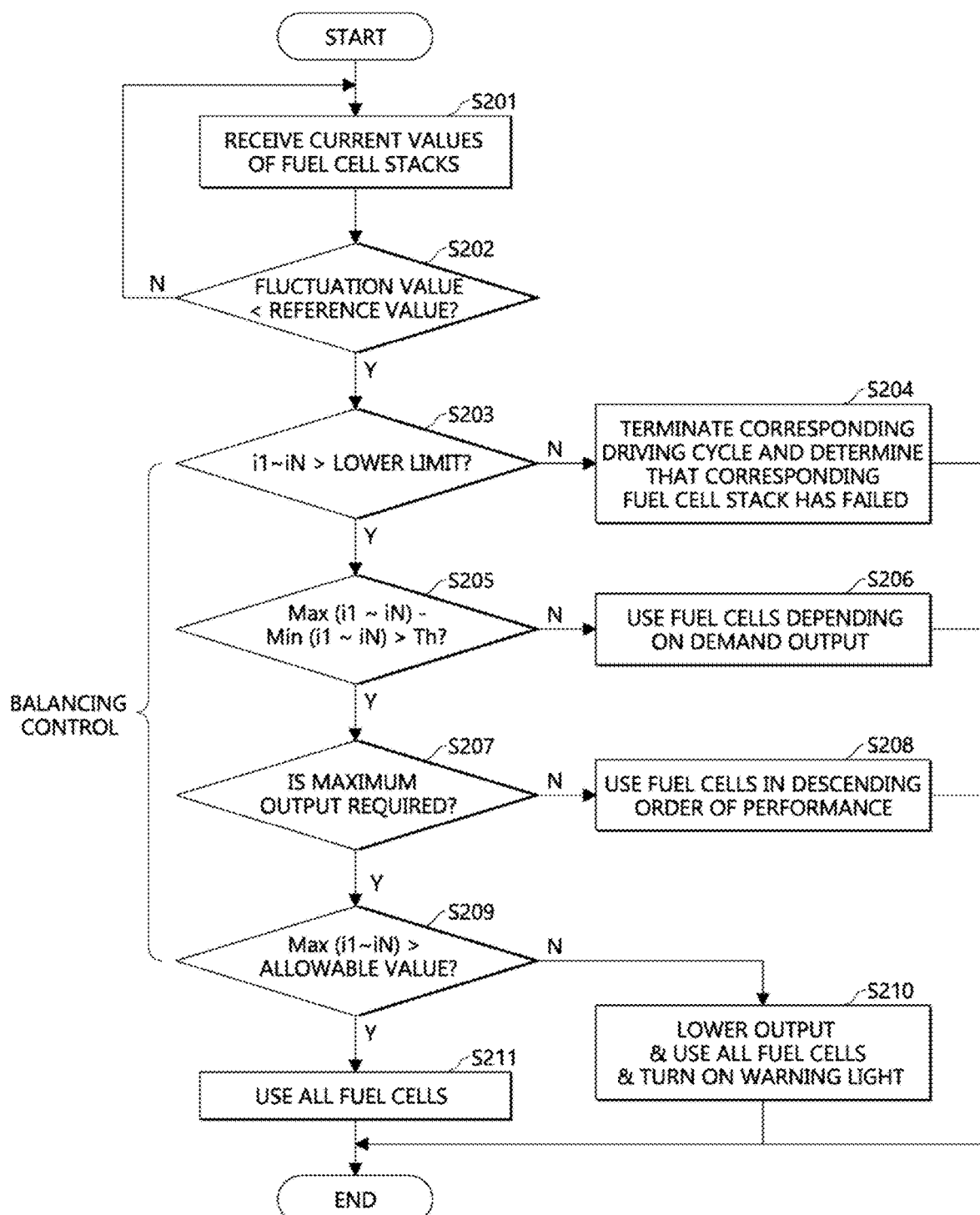
FIG. 6 is a flowchart representing the process of controlling the output of the fuel cell power net system according to an embodiment of the present disclosure.

FIG. 6 is a flowchart representing the process of controlling the output of the fuel cell power net system according to an embodiment of the present disclosure. Hereinafter, the process of controlling the output of the fuel cell power net system is described using the fuel cell power controller 3 as the subject of operation, in the same manner as FIG. 3.

The fuel cell power controller 3 receives the respective output current values of the plurality of fuel cell stacks 110 connected in parallel to form the fuel cell unit 100 (S201). There may be a delay in time until these actual values reach a target value transmitted by the fuel cell power controller 3. Therefore, the current values of the respective fuel cell stacks 110 may be confirmed in a section in which a demand output value or a voltage (Vdc) fluctuation value is small, and thereafter, control may be performed (S202).

When the fluctuation value is within a reference value, the fuel cell power controller 3 performs power balancing control depending on the respective fuel cell stacks 110. Aircraft monitoring is performed in real time in the entire section, and power balancing control depending on the respective stacks 110 is performed in a cruise mode or in a landing section alone.

First, the fuel cell power controller 3 compares the current values of the respective fuel cell stacks 110 with an End Of Life (EOL) reference value. For example, the fuel cell power controller 3 confirms whether or not there is any fuel cell stack outputting a lower value than the EOL reference value, among n fuel cell stacks (S203). When the output value of any fuel cell stack is lower than the EOL reference value, the fuel cell power controller 3 terminates a corresponding driving cycle and determines that the corresponding fuel cell stack has failed (S204). When the output value of any fuel cell stack is lower than or near to the EOL reference value, the fuel cell power controller 3 displays such a fact through an aircraft monitoring device so that a user may take action in advance.

When there is no fuel cell stack outputting a value lower than or near to the EOL reference value, the fuel cell power controller 3 compares a difference between the maximum value Max and the minimum value Min out of the sensing output values of the respective fuel cell stacks 110 with a threshold Th (S205). The sensing current values of the respective fuel cell stacks 110 mean the output current values of the respective fuel cell stacks 110, after the target voltage at the front end of the DC/DC converter, provided by the fuel cell power controller 3, has been reflected in the DC/DC converter. When the difference between the maximum value Max and the minimum value Min is not greater than the threshold Th, the fuel cell power controller 3 may operate the fuel cell stacks 110 so as to correspond to the demand output of the fuel cell unit 100, thereby producing necessary power (S206). When the difference between the maximum value Max and the minimum value Min is not greater than the threshold Th, the voltage Vdc at the front end of the DC/DC converter may be dropped so as to match the sum of the outputs required by the load controller 4. Thus, a situation in which use of additional current is required may occur.

Figure 7:
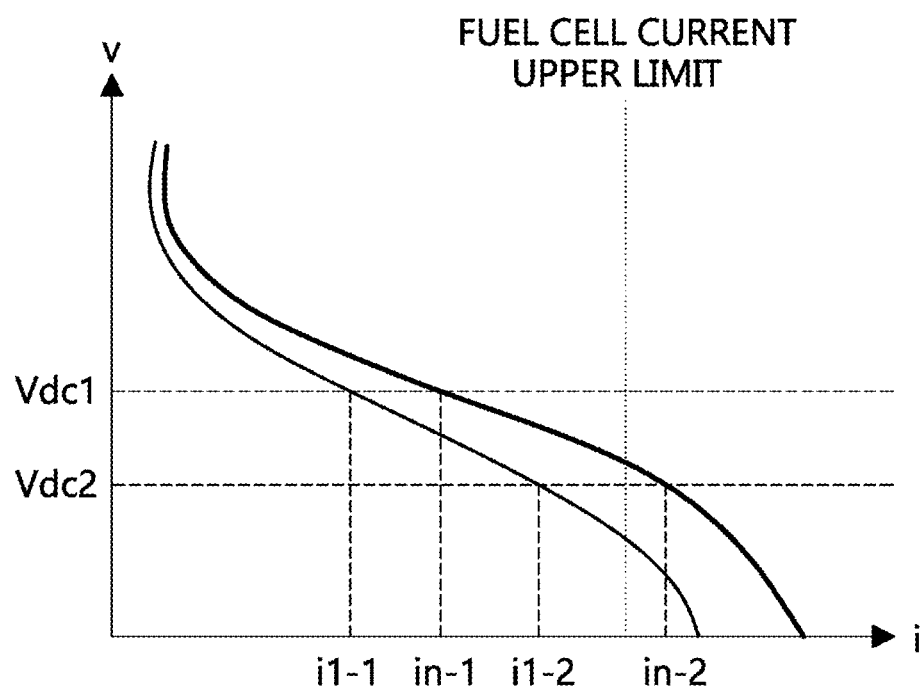
FIG. 7 is a graph showing an example of current balancing when a plurality of fuel cell stacks is provided.

FIG. 7 is a graph showing an example of current balancing when the plurality of fuel cell stacks 110 is provided. As shown in this figure, when voltage at the front end of the DC/DC converter is dropped from Vdc1 to Vdc2, balancing of the sensing output current of the first fuel cell stack #1 from value i1-1 to value i1-2 is performed. Further, the sensing output current of the $n^{th}$ fuel cell stack #n may be balanced from value in-1 to value in-2 which deviates from a fuel cell current upper limit line and is excessively located in a high-current region. Current-voltage balancing depending on the respective fuel cell stacks 110 is required so as to prevent the situation in which use of additional current is required, due to dropping of the voltage Vdc at the front end of the converter. After balancing, a situation in which current used exceeds a design limit due to drop of the voltage Vdc at the front end of the converter may be prevented (S206).

When the difference between the maximum value Max and the minimum value Min is greater than the threshold Th, the current mode of the application is confirmed. In other words, whether or not the application is in the maximum output mode is confirmed (S207). Upon confirming that the application is not in the maximum output mode, the application does not require the maximum output, and thus, some fuel cells may be used. In this example, the fuel cells may be sequentially used in descending order of performance so as to match the level of the total demand output (S208). Thereby, fuel cells which become more deteriorated may be balanced with other fuel cells.

Upon confirming that the application is in a mode in which the maximum t is required (for example, upon confirming that an aircraft application is in a take-off mode), the maximum value Max out of the sensing output values of the respective fuel cell stacks 110 is compared with an allowable value (S209). The fuel cell power controller 3 may control the switching unit 120 so as to select all of the fuel cell stacks, when the maximum value Max is less than the allowable value (S211), and may slightly lower the total output of the fuel cell stacks 110 so as to prevent the fuel cell stacks 110 from being damaged, when the maximum value Max is equal to or greater than the allowable value (S210). The fuel cell power controller 3 warns that usable thrust has been reduced through the aircraft monitoring device (S210).

Figure 8:
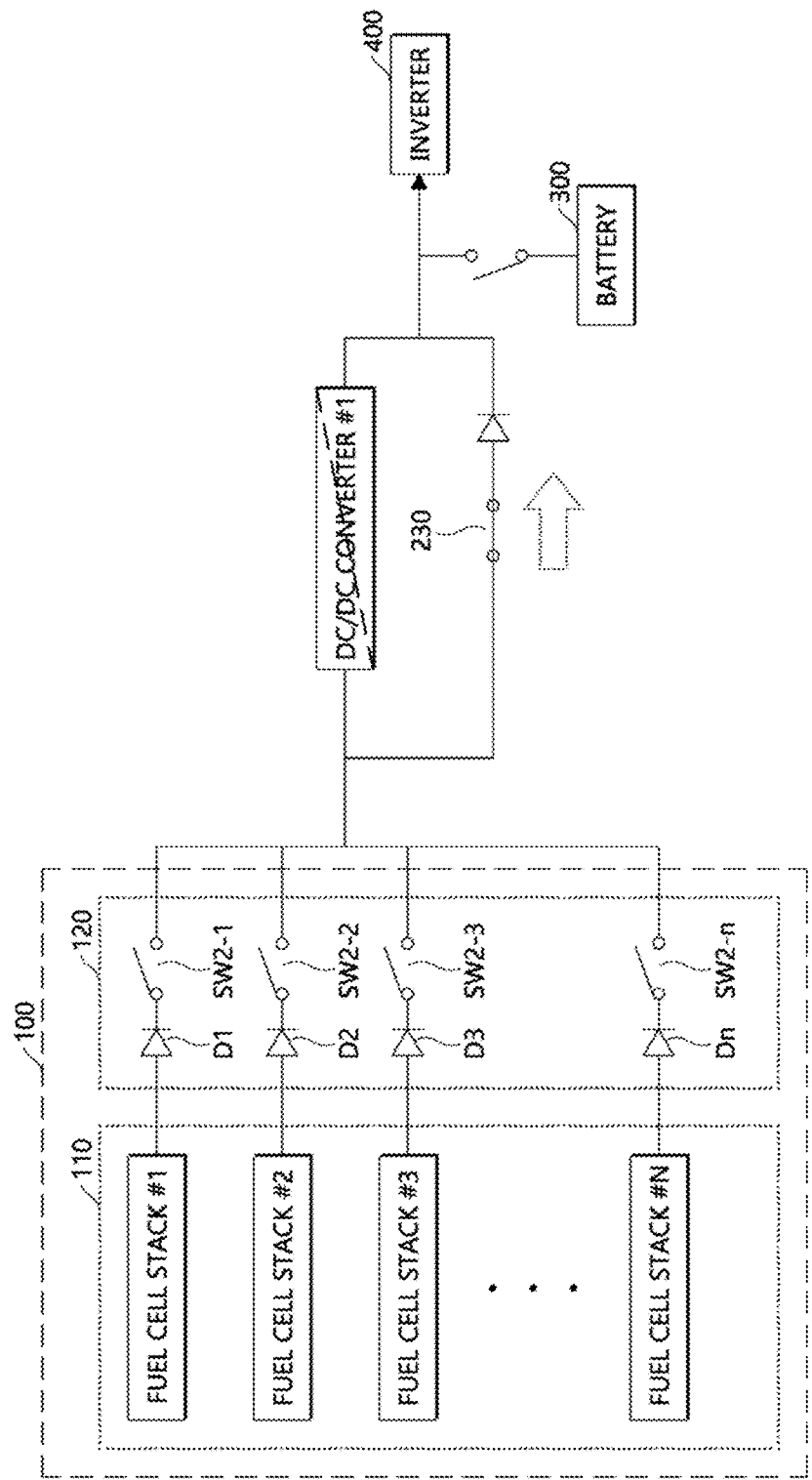
FIG. 8 is a block diagram illustrating the configuration of a fuel cell power net system according to another embodiment of the present disclosure.

FIG. 8 is a block diagram illustrating the configuration of a fuel cell power net system according to another embodiment of the present disclosure. One DC/DC converter 210 may be used as long as the DC/DC converter 210 has sufficient reliability.

The fuel cell power net system according to the embodiment shown in FIG. 8 is configured such that one DC/DC converter 210 is connected to the fuel cell unit 100 in series. A bypass circuit 230 is provided in parallel to the DC/DC converter 210 and is selectively connected to the fuel cell unit 100. The bypass circuit 230 is disposed between the fuel cell unit 100 and the inverter 400. Such a configuration may additionally have a weight gain.

In an embodiment having the above-described configuration, when the DC/DC converter 210 breaks down, the relay of the bypass circuit 230 may be connected to the fuel cell unit 100, and thus, the output of the fuel cell unit 100 may be supplied to the inverter 400 through the bypass circuit 230. In this example, the voltage is not boosted, and thus, a switching relay SW3 configured to control connection to the battery 300 may be opened. Since the voltage band is lowered, derating may be performed depending on specifications of the inverter 400, but may be different depending on demand output of an aircraft in case of emergency.

Figure 9:
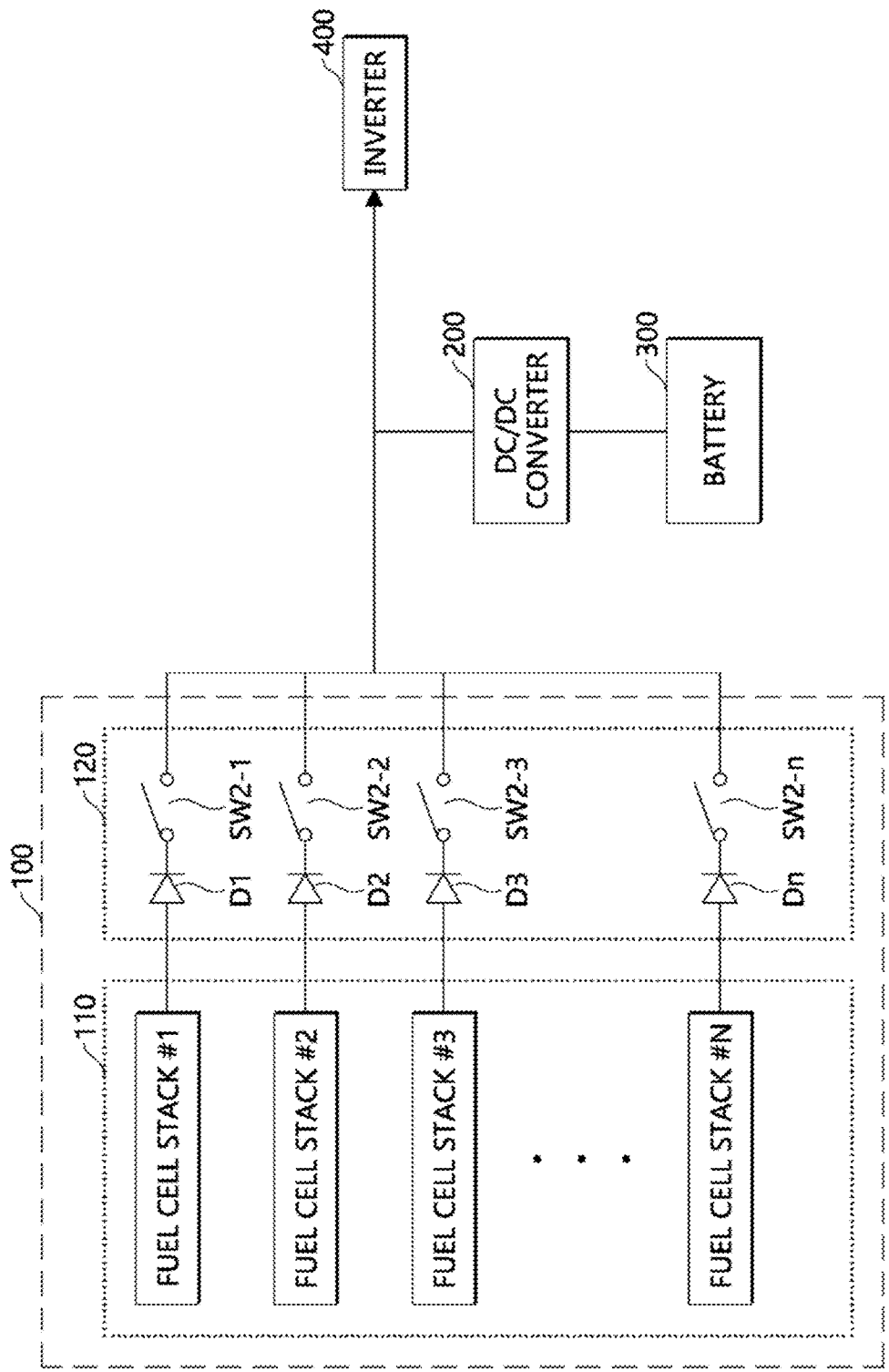
FIG. 9 is a block diagram illustrating the configuration of a fuel cell power net system according to yet another embodiment of the present disclosure.

FIG. 9 is a block diagram illustrating the configuration of a fuel cell power net system according to yet another embodiment of the present disclosure. A DC/DC converter 200 connected to the battery 300 in series is disposed between the battery 300 and the inverter 400, and is provided in parallel to the fuel cell unit 100. The DC/DC converter 200 is applied to the battery 300, when the demand voltage of the inserter 400 is relatively low or when the fuel cells of the fuel cell stacks 110 can be sufficiently stacked so as to output the demand voltage. In this example, a Bidirectional High voltage DC converter (BHDC) may be used as the DC/DC converter 200. The current value of the battery 300 is small, and thus, the BHDC is advantageous in weight compared to a general DC/DC converter.

When the fuel cell power net system according to the present disclosure is applied to an application, the fuel cell power net system uses the fuel cell unit 100 as a main power source and uses the power of the battery 300 only when an aircraft takes off. Operating in this way removes anxiety about environmental pollution caused by emission of carbon dioxide due to use of gasoline, and reduces in-flight noise compared to conventional aircrafts, thereby being expected to have a high probability of being used as a future eco-friendly propulsion system.

As is apparent from the above description, a power net system for fuel cells and a method for controlling the same according to the present disclosure may prevent rapid durability deterioration using a high current density section in a specific fuel cell stack due to performance deviation among fuel cells.

It should be apparent to those having ordinary skill in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A fuel cell power net system comprising:
a fuel cell controller configured to control current output from a fuel cell unit;
at least one DC/DC converter configured to boost DC voltage input thereto and to output the boosted DC voltage;
a battery connected to the fuel cell unit in parallel so as to supply DC power to the fuel cell unit;
a load controller configured to provide demand output information required by a load of an application; and
a fuel cell power controller configured to receive the demand output information from the load controller, to calculate output levels required by the fuel cell unit and the battery, respectively, to compare a current output level of the fuel cell unit with the output level required by the fuel cell unit, and to provide a control value to the fuel cell controller depending on a result of the comparison,
wherein, when the current output level of the fuel cell unit is less than the output level required by the fuel cell unit, the fuel cell power controller sets a voltage dropped from a voltage at a front end of the at least one DC/DC converter to a target voltage so that the fuel cell unit uses a high current.

2. The fuel cell power net system according to claim 1, further comprising an inverter configured to convert DC power provided by the at least one DC/DC converter or the battery into AC power, and to supply the AC power to the load of the application.

3. The fuel cell power net system according to claim 2, wherein the at least one DC/DC converter comprises a plurality of DC/DC converters selectively connected to the fuel cell unit in series so as to be disposed between the fuel cell unit and the inverter.

4. The fuel cell power net system according to claim 3, further comprising a first switch disposed between the fuel cell unit and the plurality of DC/DC converters so as to selectively transmit an output voltage of the fuel cell unit to the plurality of DC/DC converters.

5. The fuel cell power net system according to claim 2, wherein one DC/DC converter of the at least one DC/DC converter is connected to the fuel cell unit in series, and wherein a bypass circuit, provided in parallel to the one DC/DC converter and selectively connected to the fuel cell unit, is disposed between the fuel cell unit and the inverter.

6. The fuel cell power net system according to claim 5, wherein, when the one DC/DC converter breaks down, the bypass circuit is operated to transmit an output power of the fuel cell unit to the inverter.

7. The fuel cell power net system according to claim 2, wherein the at least one DC/DC converter is connected to the battery in series so as to be disposed between the battery and the inverter in parallel to the fuel cell unit.

8. The fuel cell power net system according to claim 1, wherein the fuel cell unit comprises:
a plurality of fuel cell stacks connected in parallel; and
a switching unit configured to select at least one of the plurality of fuel cell stacks.

9. The fuel cell power net system according to claim 8, wherein the switching unit comprises:
reverse current blocking units configured to prevent inflow of reverse current into the plurality of fuel cell stacks; and
a plurality of second switches configured to select fuel cell stacks to be used from among the plurality of fuel cell stacks.

10. The fuel cell power net system according to claim 8, wherein the fuel cell power controller checks currents of respective fuel cell stacks, and controls power balancing depending on the respective fuel cell stacks.

11. The fuel cell power net system according to claim 10, wherein the fuel cell power controller controls the power balancing in a section in which the application cruises or lands.

12. The fuel cell power net system according to claim 10, wherein the fuel cell power controller compares a difference between a maximum value and a minimum value out of sensing current values of the respective fuel cell stacks, based on a target voltage dropped from a voltage at a front end of the at least one DC/DC converter, with a threshold, and selectively controls operation of the fuel cell stacks depending on a result of the comparison.

13. The fuel cell power net system according to claim 10, wherein the fuel cell power controller compares current values of the respective fuel cells with an End Of Life (EOL) reference value, and outputs a control signal depending on a result of the comparison.

\* \* \* \* \*